Patented June 25, 1940

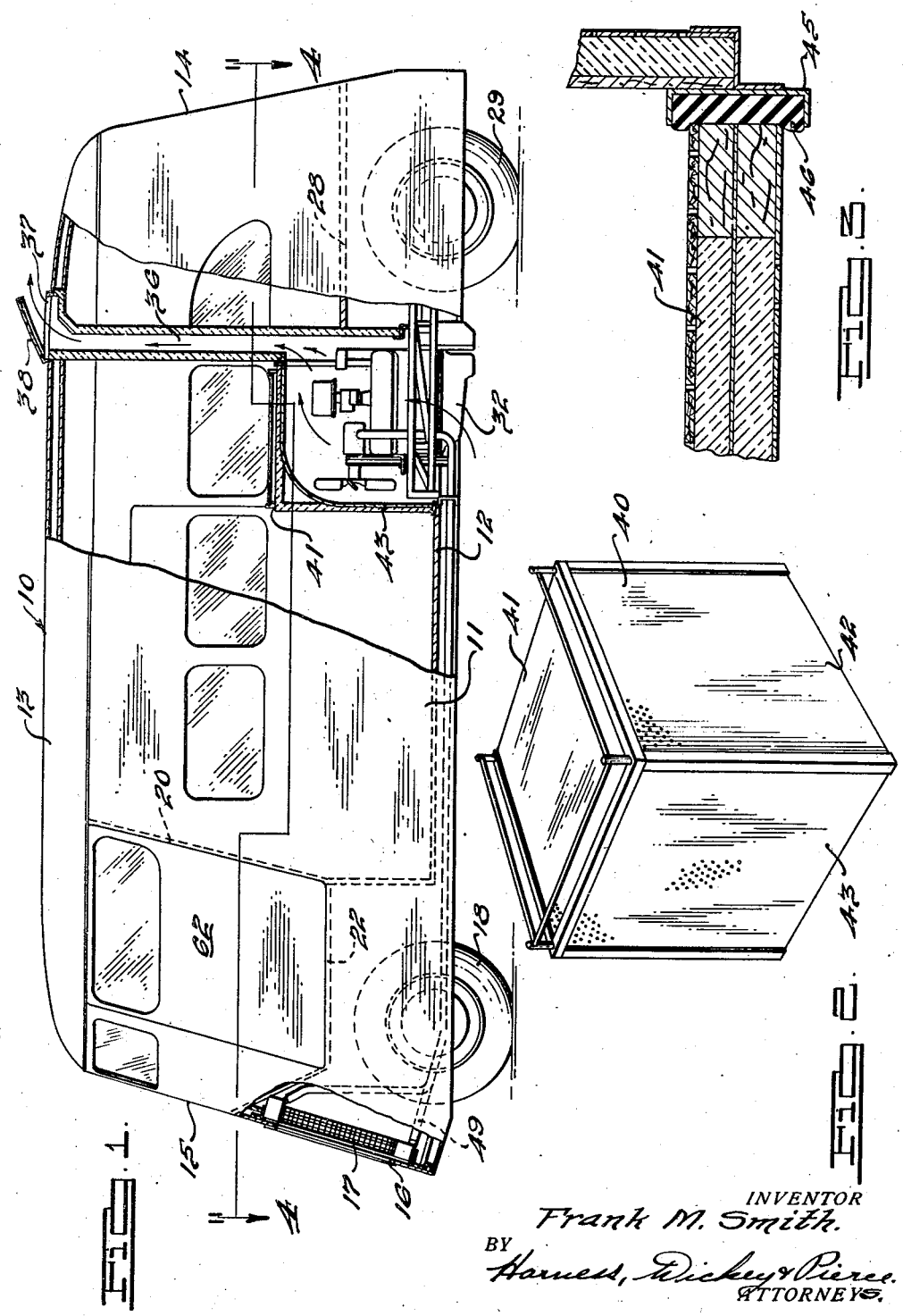

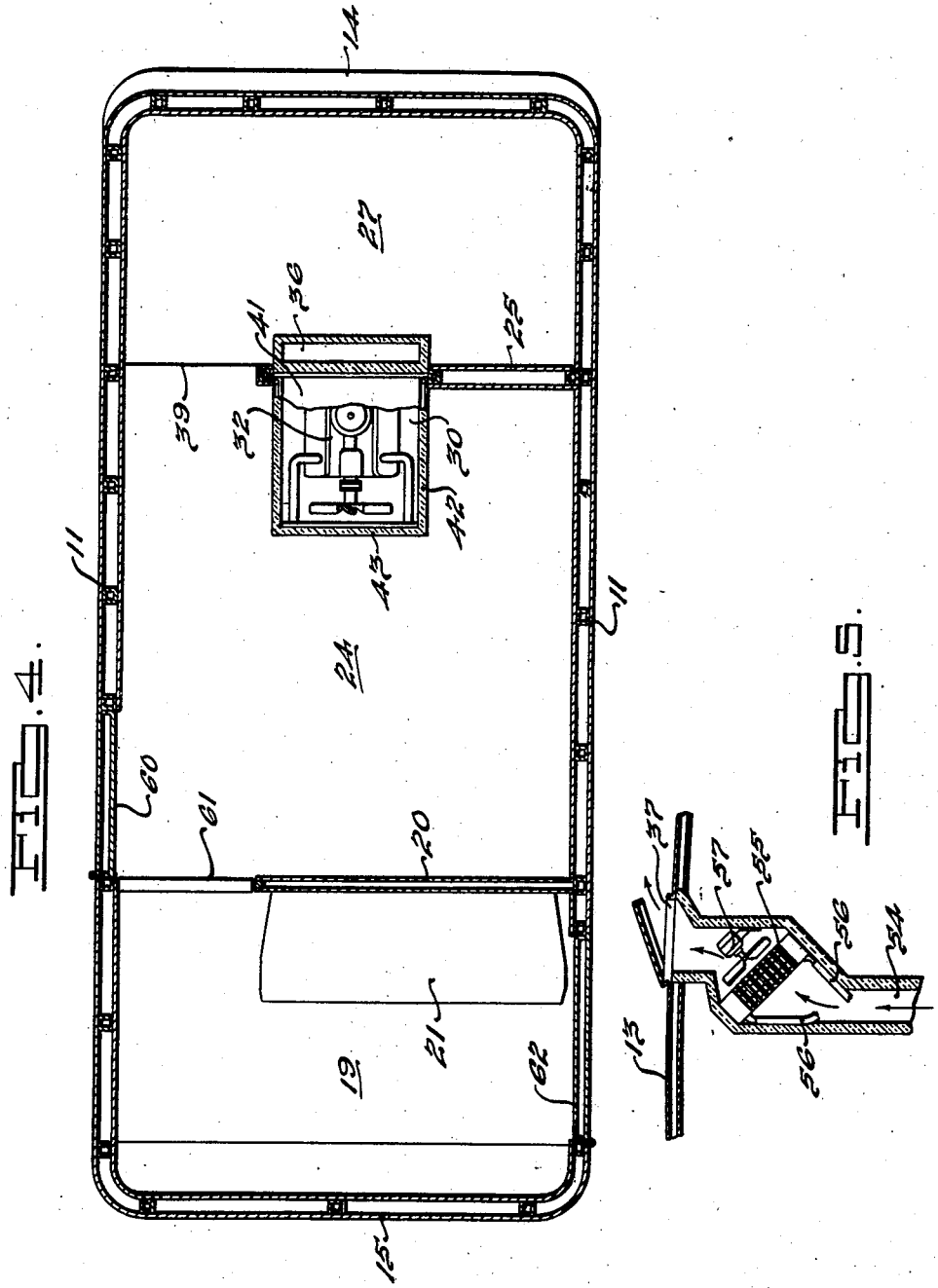

2,205,636

UNITED STATES PATENT OFFICE 2,205,636

MOTOR VEHICLE

Frank M. Smith, Dearborn, Mich., assignor, by mesne assignments, to Stout Engineering Laboratories, Inc., Dearborn, Mich., a corporation of Michigan Application August 16, 1937, Serial No. 159,208

3 Claims. (Cl. 180—54)

This invention relates generally to improvements in automotive vehicles. More particularly it relates to an automobile vehicle having a novel form of body construction which is primarily intended to make available a substantial increase in usable space within the interior of the vehicle body.

It is a primary object of the present invention to provide a vehicle body construction in which a substantial increase in the interior space available for use is made, without at the same time materially increasing the wheel base or the overall length of the vehicle body as a whole.

The present invention contemplates the provision of a vehicle body construction which is of generally rectangular configuration, having upwardly extending front and rear, as well as side walls, which together with a floor and roof form a boxlike structure having a relatively large interior space available for use. The present invention contemplates the provision of partitions interiorly of the boxlike body structure thus formed, separating the interior of the vehicle into a driver's compartment at the forward end thereof, located substantially over the front wheels of the vehicle, a central or passenger carrying compartment on a level substantially lower than the level of the driver's compartment located intermediate the front and rear wheels of the vehicle, and a rear or storage compartment located substantially over the rear wheels of the vehicle, and consequently having a floor level substantially higher than the floor level of the passenger compartment.

In order to provide adequate clearance for the front and rear wheels of the vehicle, it is necessary to provide the floor level of the compartment disposed over these wheels, substantially higher than the floor level of the central or passenger compartment and consequently while sufficient head room is available for seated paassengers in the front and rear compartments, the body may conveniently be constructed to provide sufficient head room for standing persons in the passenger compartment.

The invention contemplates the provision of a motor for driving the vehicle, located inwardly of the side walls thereof and forwardly of the rear wheels, but substantially rearwardly of the front wheels. Thus it will be seen that the motor is in substantially the longitudinal central portion of the vehicle construction as a whole. The disposition of the motor in this position has been found to be particularly advantageous from the standpoint of weight distribution and has been found to give the vehicle as a whole the desirable balance and weight distribution upon all four wheels, making it therefore exceptionally easy to handle and operate.

In order to provide adequate facilities for ventilating the motor, the present invention contemplates the provision of a flue extending substantially vertically along the partition separating the passenger compartment from the rear storage compartment, which flue opens through the roof and has its lower end communicating with a housing surrounding the upper portion of the motor. The housing surrounding the motor is open at the bottom in order that air may enter from the normal high pressure area underneath the body and pass upwardly around the motor serving to cool the same and then pass upwardly and outwardly through the flue.

The invention further contemplates the provision of a removably mounted tightly sealed housing for enclosing the front, top, and lateral sides of the motor, whereby the housing may conveniently be removed from the interior of the vehicle in order that access may be had to the motor to repair or adjust the same.

The present invention contemplates the provision of particularly effective sealing means for mounting this housing around the motor in order that there will be no communication between the interior of the housing and the interior of the passenger compartment whereby fumes from the motor might possibly enter the interior of the vehicle body construction as a whole.

Still further the invention contemplates the provision of a housing for said motor of such construction that it serves to preclude the transmission of sound from the motor to the interior of the vehicle.

Still further the present invention contemplates the provision of a housing of such design and construction that it may conveniently be utilized as a table or support within the seating compartment of the vehicle as a whole, thereby providing a useful and ornamental interior appearance for the passenger compartment of the vehicle and yet at the same time permitting the disposal of the motor in a position where it will be particularly effective in obtaining the desired weight distribution in the vehicle construction as a whole.

Still further the present invention contemplates the provision of a radiator serving to cool the circulatory system of the motor, which radiator may be placed remotely from the motor at the forward end of the vehicle according to one form of the invention or which may be disposed transversely in the vertically extending ventilating flue and may if found either desirable or necessary have a fan associated therewith for increasing the circulation through the flue.

Many other and further objects, advantages, and features of the present invention will become clearly apparent from the following specification when considered in connection with the accompanying drawings forming a part thereof.

Figure 1 is a side elevational view with parts thereof in section, illustrating in detail the exterior configuration of the vehicle body as a whole, and specifically illustrating the manner in which the motor is mounted in the longitudinal central portion thereof;

Fig. 2 is an enlarged perspective view of the removably mounted housing, which serves to provide a closure for separating the motor compartment from the passenger compartment of the vehicle body;

Fig. 3 is an enlarged fragmentary sectional view taken through the connection between the removable housing for the motor and the adjacent portion of the partition member to which this housing is sealed, illustrating the manner in which an extremely tight and effective sealed joint between the housing and the adjacent portions of the body is obtained;

Fig. 4 is a transverse sectional view taken substantially along the line 4—4 of Fig. 1, illustrating in detail the interior construction and arrangement of the compartments within the vehicle body;

Fig. 5 is a fragmentary sectional view, illustrating a modified form of the invention, in which the flue for conducting air from the motor outwardly through the vent in the roof of the vehicle is provided with an enlarged portion in which a radiator and circulatory fan may be mounted if desired.

With more particular reference to the drawings, it will be readily appreciated that the construction illustrated therein is more or less diagrammatic and merely discloses one specific construction and arrangement of parts embodying the inventive improvements of the present invention.

While the particular size of the vehicle is not a particularly important feature of the present invention, the improved vehicle body construction may be mounted upon a chassis having a wheel base substantially the same length as conventional present day automotive vehicles. In the construction shown, the vehicle includes a body, generally designated as 10, including slide walls 11 extending substantially vertically from a floor 12 to a generally rounded roof 13. The front and rear walls 15 and 14, respectively, of the vehicle body slope upwardly at a rather steep angle from the level of the floor to mate with the roof 13. The front wall 15 is provided with a grilled opening 16 interiorly of which is mounted a radiator 17. The interior of the vehicle body construction as a whole is provided with a partition 20 which serves to separate the forward portion of the vehicle to provide a driver's compartment 19 having a seat 21 therein. It will be noted by reference to Fig. 1 of the drawings that this driver's compartment is located directly over the front wheels 18 of the vehicle and is provided with a floor 22 on a level substantially higher than the level of the floor 12 of the main or passenger carrying compartment 24.

The interior of the body is likewise provided with a partition 25 which separates the main passenger carrying compartment 24 of the vehicle from a rear or storage compartment 27, which, similar to the driver's compartment 19, is located over the wheels of the vehicle and consequently is provided with a floor 28 on an elevation sufficiently high to provide adequate clearance for the rear wheels 29 of the vehicle.

From the foregoing it will be seen that the floor of the vehicle comprises the flooring 12, 22, and 28, and that the floor 28 is located over the rear wheels 29 and that the floor 22 is located over the front wheels 18, in each instance these floors being sufficiently high to provide adequate clearance for the wheels. In this way it will be understood that all available interior space of the vehicle is utilized.

While the body construction as a whole may be formed in any suitable conventional manner, it has been found preferable to dispense with a chassis entirely and to form the frame from a plurality of tubular members welded together to provide a strong, rigid, trusslike framework for the body, which constitutes not only the body of the vehicle but the chassis. The floor 12 of the vehicle is provided with a generally rectangular opening 30 therein immediately forwardly of the partition 25 and inwardly from the side walls 11. A conventional automobile motor, generally designated as 32, is mounted in this opening and it will be readily apparent that this motor may drive the rear wheels 29 in much the same manner as a conventional automobile motor drives these wheels in a conventional vehicle construction.

Formed as a part of the partition 25 is an upwardly extending hollow flue 36 which is preferably formed of suitable sound proofing material and which has its upper end opening through a suitable aperture 37 in the roof 13 of the vehicle. The port 37 may be conveniently closed by a pivotally mounted closure member 38 which may, if desired, be operated from the interior of the vehicle by means of suitable mechanism not shown.

The lower end of the flue 36 opens above the motor 32 and it will be noted that the rear wall of the flue extends downwardly to a point beneath the floor 28 of the rear or storage compartment of the vehicle. Consequently, the rear wall of the flue 36 forms a rear wall for housing the motor as a whole as hereinafter described in detail. Likewise, it will be seen that this flue structure 36 serves together with the partitioning member 25 to aid in defining the rear or storage compartment 27 of the vehicle body construction, access to which may conveniently be had through a suitable opening 39 at one side of the vehicle.

The motor is enclosed by means of a removably mounted housing, generally designated as 40, which is preferably formed of suitable soundproofing material in order to eliminate the possibility of the motor noise being transmitted into the passenger carrying compartment of the vehicle. The housing 40 includes a top wall 41, side walls 42, and a front wall 43. The housing 40 may conveniently be locked in position in the interior of the vehicle body by suitable fasteners of any conventional type.

The bottom marginal edges of the front wall 43 and side walls 42, as well as the rear marginal edges of the side walls 40 and top wall 41, are sealed to the adjacent portions of the body structure in the manner disclosed in detail in Fig. 3 of the drawings. Throughout the portions of the vehicle body with which these marginal portions of the housing 41 are adapted to mate, a channel member 45 is secured in position and carries interiorly thereof a resilient sealing strip 46 which may conveniently be formed of sponge rubber or other suitable resilient material. It will, therefore, be readily apparent that when the housing 40 is secured in position, it will be tightly sealed with respect to the adjacent portions of the vehicle body and will serve to preclude the possibility of air passing from the space around the motor into the interior of the vehicle body.

The motor being enclosed in this manner and the housing in which the motor is housed being open at the bottom, it will be apparent that air may pass upwardly from the underside of the vehicle around the motor and outwardly through the flue 36.

As is seen in Figure 1 of the drawings, the radiator 17 may be connected to the motor by means of suitable conduits 49 in order that water may circulate through the radiator and cooling system of the motor in the conventional manner.

As a modified form of the invention, the flue structure may be altered in the manner disclosed in Fig. 5 of the drawings. In this form of the invention, the flue is provided with an enlarged portion adjacent its upper end to provide means for mounting a radiator 55, which radiator will inherently be in the path of air passing upwardly through the flue and which may be connected to the cooling system of the motor by suitable conduits 56. If desired, a motor driven fan 57 may be mounted in the flue 54 to accelerate movement of the air upwardly around the motor through the flue and through the radiator 55 and thence upwardly through the opening 37 in the roof of the vehicle.

From the foregoing, it will be readily appreciated that the vehicle body construction disclosed has the motor thereof mounted in such a position that a particularly effective distribution of weight is obtained. Consequently, it will be readily appreciated that the interior space available within the vehicle body is substantially greater than the interior space available in conventional present day vehicle body constructions. It will also be readily apparent that these particularly advantageous results are achieved without increasing the overall length of the vehicle and without substantially increasing the wheel base thereof. Therefore, the vehicle will handle in much the same manner as conventional present day vehicles and will at the same time provide a vastly increased amount of interior available useable space.

Access to the interior of the vehicle may be conveniently had through a door 60 which opens through the side wall 11 of the vehicle into the central or passenger carrying compartment 24. Access to the driver's compartment may be had either through a door 61 connecting with the passenger carrying compartment 24 or through a door 62 opening directly into the driver's compartment of the vehicle from the outside.

As has been explained above, access to the rear or storage compartment 27 may be conveniently had through the opening 39 at one side of the motor housing.

While but one specific form of the invention has been disclosed, many other and various forms thereof embodying the improvements set forth in the subjoined claims will be clearly apparent to those skilled in the art.

What is claimed is:

1. An automotive vehicle including front and rear walls, side walls, a floor, and a roof, a partition extending transversely of the vehicle substantially forwardly of the rear wall thereof, an opening in the floor of said vehicle in substantially the central portion thereof extending forwardly from said partition, a motor for driving said vehicle mounted in said opening, said partition embodying a flue extending vertically through the roof of the vehicle, and a removable housing adapted to cooperate with said floor, partition and flue serving to enclose said motor, and means for sealing the marginal portions of said housing to preclude communication between the interior of said housing and the interior of said vehicle body.

2. An automotive vehicle including front and rear walls, side walls, a floor, and a roof, a partition extending transversely of the vehicle substantially forwardly of the rear wall thereof, an opening in the floor of said vehicle in substantially the central portion thereof extending forwardly from said partition, a motor for driving said vehicle mounted in said opening, said partition embodying a flue extending vertically through the roof of the vehicle, and a removable housing adapted to cooperate with said floor, partition and flue serving to enclose said motor, means for sealing the marginal portions of said housing to preclude communication between the interior of said housing and the interior of said vehicle body, and means in said flue serving to cause the circulation of air upwardly through the opening in the floor of said vehicle past said motor and out through said flue.

3. An automotive vehicle including front and rear walls, side walls, a floor, and a roof, a partition extending transversely of the vehicle substantially forwardly of the rear wall thereof, an opening in the floor of said vehicle in substantially the central portion thereof extending forwardly from said partition, a motor for driving said vehicle mounted in said opening, said partition embodying a flue extending vertically through the roof of the vehicle, and a removable housing adapted to cooperate with said floor, partition and flue serving to enclose said motor, means for sealing the marginal portions of said housing to preclude communication between the interior of said housing and the interior of said vehicle body, means in said flue serving to cause the circulation of air upwardly through the opening in the floor of said vehicle past said motor and out through said flue, and a radiator in said flue connected to the cooling system of said motor.

FRANK M. SMITH.